United States Patent
Bond et al.

(10) Patent No.: US 7,437,481 B2
(45) Date of Patent: Oct. 14, 2008

(54) METHODS AND APPARATUS FOR UTILIZING USER SOFTWARE TO COMMUNICATE WITH NETWORK-RESIDENT SERVICES

(75) Inventors: Gregory W. Bond, Hoboken, NJ (US); Thomas Smith, Westfield, NJ (US); Pamela Zave, Chatham, NJ (US)

(73) Assignee: AT&T Corp., New York, NY (US)

( * ) Notice: Subject to any disclaimer, the term of this patent is extended or adjusted under 35 U.S.C. 154(b) by 830 days.

(21) Appl. No.: 10/770,943

(22) Filed: Feb. 3, 2004

(65) Prior Publication Data

US 2005/0171999 A1    Aug. 4, 2005

(51) Int. Cl.
G06F 15/16    (2006.01)

(52) U.S. Cl. .................. 709/246; 709/218; 709/232; 709/236

(58) Field of Classification Search ................. 709/218
See application file for complete search history.

(56) References Cited

U.S. PATENT DOCUMENTS

| | | | |
|---|---|---|---|
| 6,741,853 B1 * | 5/2004 | Jiang et al. .................. 455/418 |
| 2002/0021307 A1 | 2/2002 | Glenn et al. |
| 2002/0103917 A1 * | 8/2002 | Kay et al. .................... 709/229 |
| 2003/0054810 A1 * | 3/2003 | Chen et al. .................. 455/422 |
| 2004/0006623 A1 * | 1/2004 | Gourraud et al. ............. 709/227 |
| 2005/0198149 A1 * | 9/2005 | Johnson et al. .............. 709/206 |

FOREIGN PATENT DOCUMENTS

| | | |
|---|---|---|
| EP | 1 227 635 A | 7/2002 |
| WO | WO 01/37139 | 5/2001 |
| WO | WO 03/077140 | 9/2003 |
| WO | WO 03/094011 | 11/2003 |

OTHER PUBLICATIONS

Bond, Gregory W., et al., "An Open Architecture For Next-Generation Telecommunication Services", SRI International, Jul. 11, 2003, pp. 1-27.
European Search Report dated May 18, 2005 for European patent applicatin EP 05 10 0464.

* cited by examiner

*Primary Examiner*—Jason Cardone
*Assistant Examiner*—Nicholas Taylor
(74) *Attorney, Agent, or Firm*—Priest & Goldstein, PLLC

(57) ABSTRACT

Popular operating systems for user devices, such as personal computers (PCs), PDAs, pocketPCs, smartphones, and similar such personal devices, typically come bundled with software that is already installed, maintained and run on a user's computer, namely, a non-specialized HTTP client/web browser and a non-specialized instant messaging client. A device is described which presents a user's instant messaging client and HTTP client/web browser as a unified device for handling real-time user interactions with a network resident application. Since this device represents a network application's interface to a user it is termed a pseudodevice. The pseudodevice, which interfaces with network application software, formats user queries as hyperlinked instant messages that are then sent to the user. The user responds by clicking on a hyperlinked message, which invokes the user's web browser and causes the browser to convey the response as an HTTP request back to the pseudodevice. The pseudodevice adapts communication to the user device depending upon the HTTP requests it receives.

13 Claims, 6 Drawing Sheets

Network-Resident Interface Pseudocode

Generate a unique session ID for a request and add requestor entry in 'Request Table.'
Format a request message using the 'Instant Messaging Message Formatter.'
Send a message to a user device using the 'Instant Messaging Client/Server.'

— 602

Web Browser/Instant Messaging Interface Pseudocode

If a user device's request URL type is 'choose' or 'enter' then the 'Web server' interface returns a web page to the user device with the message: 'Your response has been received. Thank you.'
Then the 'Web server' looks up an entry in the 'Request Table' corresponding to the response if receives from the user device, and conveys the response to the requester.

If a user device's request URL type is 'prompt' then the 'Web server' interface returns a web page to the user device with a form for entering a response to the requester.

— 610

METHODS AND APPARATUS FOR UTILIZING USER SOFTWARE TO COMMUNICATE WITH NETWORK-RESIDENT SERVICES

FIELD OF THE INVENTION

The present invention generally relates to improvements in internet protocol telecommunications and more particularly to techniques for removing or reducing the need for specialized software residing on user's machines for interacting with network software applications.

BACKGROUND OF THE INVENTION

Software applications typically interact with a user by posing a query and then receiving a user's response. Some software must always exist on the user's computer to perform this task, even if the application that the user is interacting with exists in the network. For example, consider a network-resident telephony service that prompts a called party at his or her computer to choose a phone to direct an incoming call to. Some software must reside on the called party's computer to convey the prompt from the network to the user and then convey the user's response back to the network. The problem is that one would like to avoid mandating that all users of a service install, run, and maintain specialized software on their computer to convey queries and responses between the user and network-resident services. However, any general solution to this problem should desirably ensure that it supports the bulk of the anticipated classes of user interaction, and also must be extensible enough for use by many applications.

SUMMARY OF THE INVENTION

One aspect of the present invention addresses advantageous techniques for utilizing software that is already installed, maintained and run on a user's device, namely, a non-specialized HTTP client, such as Microsoft Internet Explorer® and Pocket Internet Explorer, Netscape Navigator®, Opera for Smartphone/personal digital assistant (PDA) and other such web browsers, and a non-specialized instant messaging client, such as Microsoft Windows® Messenger, AOL Instant Messenger®, Opera Instant Messenger Client for Smartphone/PDA and the like, to address such needs and problems. Popular operating systems for user devices, such as personal computers (PCs), PDAs, pocketPCs, smartphones, and similar personal devices, typically come bundled with these two types of applications. In one aspect, the invention may be embodied as a device which presents a user's instant messaging client and HTTP client as a unified device for handling user interactions with a network resident application. In another aspect, the invention may be embodied as a pseudodevice software interface function which presents a user's instant messaging client and HTTP client as a unified interface for handling user interactions with a network resident application. Since the novel device represents a network application's interface to a user it is referred to herein as a pseudodevice. For example, the pseudodevice, which interfaces with network application software, formats user queries as hyperlinked instant messages that are then sent to the user. The user responds by clicking on a hyperlinked message, which invokes the user's web browser and causes the browser to convey the response as a hyper-text transfer protocol (HTTP) request back to the pseudodevice which advantageously provides real-time interaction with the network application and the user device.

A more complete understanding of the present invention, as well as other features and advantages of the invention, will be apparent from the following detailed description and the accompanying drawings.

BRIEF DESCRIPTION OF THE DRAWINGS

FIG. 6 illustrates high level pseudocode for the pseudodevice in accordance with the present invention.

DETAILED DESCRIPTION

Figure 1:
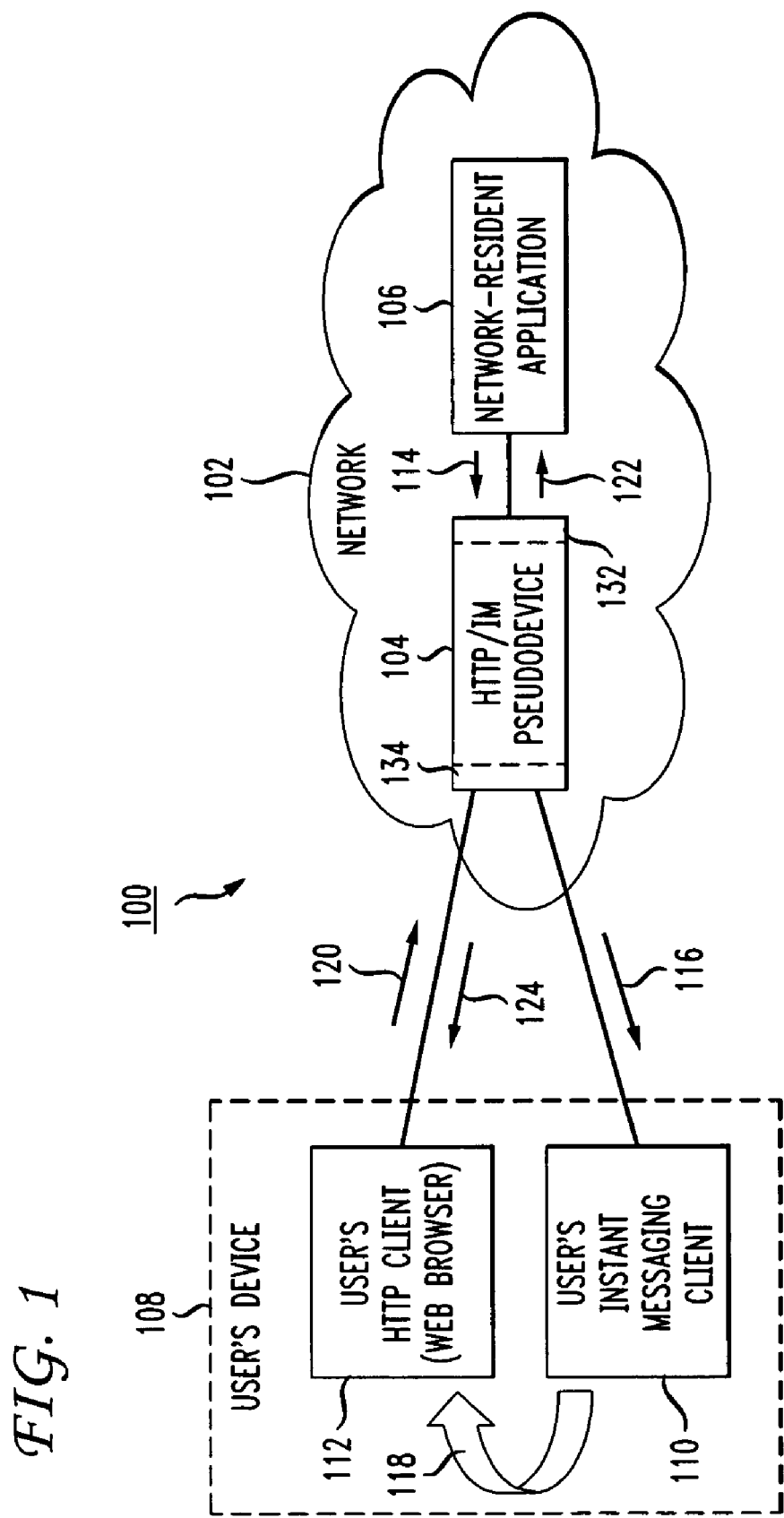
FIG. 1 illustrates a high level view of a pseudodevice in accordance with the present invention operating in a network to support communication with a user's device.

FIG. 1 shows a high level view of an overall system 100 employing a presently preferred embodiment of a general-purpose, network-resident software component, called an HTTP/Instant Messaging Pseudodevice 104 in accordance with the present invention, hereafter referred to as the pseudodevice 104. The system 100 is made up of a network 102 which includes the pseudodevice 104 and a network-resident application 106 and a user's device 108 which includes a user's non-specialized instant messaging client 110 and a user's non-specialized HTTP client, such as web browser 112. A network, in the context of the present invention, is a system made up of computers, servers, user-devices, and the like, and an interconnection fabric capable of interconnecting user devices within the system to provide, for example, internet services. A user device may be a PC, PDA, pocketPC, smartphone or similar device. The network-resident application 106, hereafter referred to as the service, can pose queries to the pseudodevice 104 which are formatted and transmitted to the user device 108. The service 106 also receives from the pseudodevice 104 responses from a user working on the user device 108. The pseudodevice 104 conveys queries 114 from the service 106 as hyperlinked instant messages 116 directed to the user's instant messaging client 110. The user initiates a response 118 which causes the user's web browser 112 to generate HTTP requests 120 to be sent to the pseudodevice 104. Pseudodevice 104 generates a pseudodevice response 122 which is conveyed back to the service 106. For every HTTP request 120, an HTTP response 124 is generated. The invention is called a pseudodevice because it presents a user's instant messaging client and HTTP client/web browser as a unified device for handling user interaction from the perspective of a service, such as service 106. For simplicity, FIG. 1 shows only a single service 106 and a single user device 108, however, the present invention may simultaneously accommodate multiple services and user devices. For example, depending on the network configuration, the service 106 and the pseudodevice 104 may reside in the network on the same server. In a system with multiple services, the services may be distributed among multiple servers communicating with a single pseudodevice. In addition, it is appreciated that other alternate implementations may be used. For example, the HTTP client capabilities of a user device, such as provided by a typical web browser, could be included in the user's instant messaging client. This alternative implementation would still interact with the pseudodevice as described in the present invention.

The pseudodevice 104 has two interfaces: one interface 132 interfaces with the service receiving queries/requests 114 and providing responses 122. The other interface 134 interfaces with the user's instant messaging client to provide hyperlinked messages 116, and the user's web browser to receive HTTP requests 120 and provide HTTP responses.

Network-Resident Service Interface

The pseudodevice 104 network-resident service interface 132 receives requests 114 for a specified user 108 from the service 106 and converts the request to hyperlinked instant messages. The pseudodevice 104 then sends the messages 116 to the user's instant messaging client 110. Typically, instant messaging clients have message format constraints such as the maximum line length, so the pseudodevice 104 is responsible for formatting the request to satisfy these constraints. It is appreciated that alternative media can be supported by the pseudodevice, such as video, speech/audio, and data file transfers, in addition to the presently preferred text messaging approach described in further detail herein.

The pseudodevice 104 may also permit the service 106 to specify an identity for the sender of the request. In this way, the pseudodevice 104 can send the request to the user so that it appears to be coming from the specified instant messaging user. For example, a call-forwarding service might specify that requests appear to be sent by a "user" named "CallForwardingService."

The service 106 specifies the type of query to send to a user. The interface 132 supports the most common query types. For example, the following query types are supported:

display(strings) Display the strings to the user.
choose(strings) Offers the strings to the user as menu choices.
prompt(string) Offers the string to the user as a prompt for information to be entered.

The display query only needs to be formatted to satisfy the instant messaging client's message constraints and then forwarded to the user's instant messaging client. The remaining two queries require that the pseudodevice format the queries as hyperlinked text messages. It will be recognized that the present invention can be adapted to support other queries.

When the service 106 requests that the pseudodevice 104 query a user 108, the pseudodevice 104 generates a unique session identifier for that query which is embedded in a uniform resource locater (URL) associated with the hyperlinked text message that is sent to the user's instant messaging client. The session identifier is used to associate a user's response via HTTP with the original query.

Such a hyperlinked message is typically of the form:
<A
HREF=http://pdhost:pdport/
   path?responsetype=type&responseval=val&session=sid>
   message</
A>
where
   pdhost:pdport is the IP address and port of a web server at which the pseudodevice can be accessed. This is discussed in greater detail below in the "HTTP Interface" section.
   path is the path at which the web server accesses the pseudodevice. This is also discussed in further detail below in the "HTTP Interface" section.
   type is one of 'choose,' or 'prompt', or 'enter', and is discussed in further detail in the "HTTP Interface" section.
   val is a string representing a user's response to a query.
   sid is a unique string identifier associated with the query.

message is the text that is displayed in the user's instant messaging client as a hyperlink.

The URL embedded in the hyperlinked message supports a user response to a choose, prompt, or enter query. The chosen response is conveyed back to the pseudodevice 104 when the user clicks on the hyperlinked message 118. Clicking on the message has the effect of launching the user's web browser 112 to access the pseudodevice 104 pointed to by the embedded URL. When the URL request is received by the pseudodevice 104, the "type," "val," and "sid" values are extracted from the URL in order to obtain the user's response to a query. The response 122 is then conveyed to the service 106 that initiated the user query.

When the query type is 'choose,' the pseudodevice 104 sends one hyperlinked text message 116 for each choice offered to a user. The URLs embedded in text messages differ in their "val" field in order to be able to distinguish which choice a user makes when they click on a particular message.

When the query type is 'prompt,' the pseudodevice 104 sends a single hyperlinked message 116 to the user. When the user clicks on the message 118, the user's web browser 112 makes an HTTP request 120 to the pseudodevice 104. The pseudodevice 104 responds by sending the browser a web page containing a simple form for entering a response to the query. When the user submits the form, the pseudodevice receives a second HTTP request that contains the user's response.

It will be appreciated that the URL may take another form, for reasons of security or other factors, as long as the parameter values, as described herein, are recoverable by the pseudodevice.

Instant Messaging and Web Browser Interface

The pseudodevice interacts with a user's instant messaging client in order to send the user hyperlinked messages. There are two possible approaches the pseudodevice can use to accomplish this task: as an instant messaging client, or as an instant messaging server.

If the pseudodevice acts as an instant messaging client, then the pseudodevice sends hyperlinked text messages to the user so that the messages appear to the user to come from the same instant messaging "user." Using this approach, it is not possible for the pseudodevice to send messages to a user so that they appear to come from different, service-specified user names. If the instant messaging system uses a centralized server, which is a common configuration, then using this approach, messages from the pseudodevice to a user must first travel to the centralized server before they are sent to the user.

If the pseudodevice acts as an instant messaging server, then the pseudodevice is able to directly send messages to the user. Furthermore, the pseudodevice is able send text messages so that they appear to the user to come from arbitrary instant messaging users.

HTTP Interface

The pseudodevice interacts with a user's web browser in order to receive HTTP requests that contain a user's response to a query. The pseudodevice is associated with an HTTP server, which may be integral to the pseudodevice, or may be external, as is common in HTTP deployments. The HTTP server associated with the pseudodevice passes HTTP requests received from the user's browser to the pseudodevice for processing.

The HTTP interface 134 processes HTTP GET requests for URLs, where the URLs are of the form described in the "Network-Resident Service Interface" section.

If the "type" is 'choose,' then the pseudodevice simply provides "val" to the service request associated with "sid."

If the "type" is 'prompt,' then the pseudodevice responds to the request with a web page containing the "val" as a prompt, a form field to capture the value of the user's response, and a button the user presses to submit the response. When the user submits the response, the pseudodevice HTTP interface will receive a GET request with a URL of the form described in the "Network-Resident Service Interface" section where "type" is 'enter,' "val" is the value entered by the user in the form field, and "sid" is the same as it was in the original "prompt" request.

Pseudodevice Interfaces

In the previous section, an overview of the two pseudodevice interfaces 132 and 134 was provided, and now a more detailed description is provided in the interface tables below.

when the network-resident application 106 makes a request and the pseudodevice 104 passes the request to the user, the request is also held by the pseudodevice 104 until the pseudodevice 104 has received the user's response. This synchronous form of interaction between the network-resident application and the pseudodevice is indicated by the thick vertical line on the pseudodevice's sequence diagrams for FIGS. 3 and 4. Note that asynchronous interaction could be used between the network-resident application and the pseudodevice in lieu of synchronous interaction without loss of generality, however, synchronous interaction has been chosen to simplify the presentation and better focus on the inventive aspects of the invention.

Figure 2:
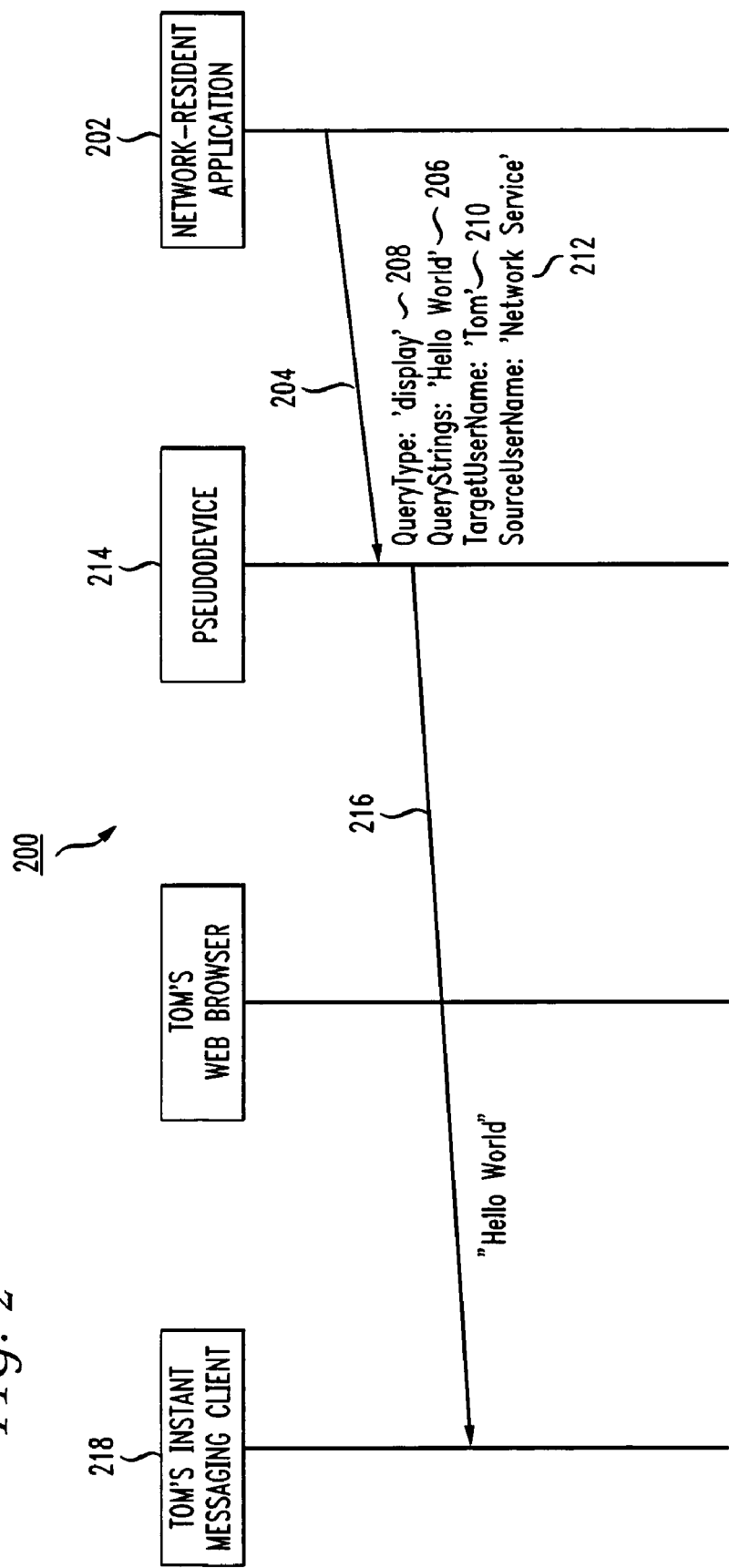
FIG. 2 illustrates a 'display' query sequence diagram illustrating aspects of the present invention.

FIG. 2 shows the display query sequence diagram 200 for a scenario where a network-resident application 202 makes a request 204 that a simple message 'Hello world' 206 be

| Interface | Pseudodevice Parameter | Description |
|---|---|---|
| Network-Resident Service | Input: QueryType<br>Input: QueryStrings<br>Input: TargetUsername<br>Input: SourceUsername (optional)<br>Output: Response | The QueryType is one of: display, choose, prompt.<br>The QueryStrings are the strings to be displayed to user that are associated with the QueryType e.g. for 'QueryType display', the QueryString would be the message to display to the user. The TargetUserName is the instant messaging name of the user to receive the query.<br>The SourceUserName is the instant messaging name that the user will receive the query from. This is only applicable if pseudodevice acts as an instant messaging server.<br>The Response is the user's response to query. If the query was 'display,' then no response is required. If the query was 'choose,' then a string representing the user's choice is returned e.g. return value of '3' means the user chose the 3$^{rd}$ choice. If the query was 'prompt,' then an arbitrary string representing user's response is returned. |
| Instant Messaging and Web Browser | Input: HttpRequest<br>Output: HttpResponse | If the user has clicked on a query link displayed in their instant messaging client then an HttpRequest is generated by the user's browser. If the user is responding to a 'choose' query, then the HttpResponse is a web page confirming that the user's response has been received. If the user is responding to a 'prompt' query then the HttpResponse is a web page containing a simple form that prompts the user to enter additional information. When the user enters the additional information and submits the form, then the browser's HttpRequest will include the user's response. The HttpResponse returned is a web page confirming that the user's response has been received. |

In the above table, the type of interface, network-resident service 132 or instant messaging and web browser 134, is matched with appropriate input and output pseudodevice parameters and a description of these parameters is provided.

Sequence Diagrams

Figure 3:
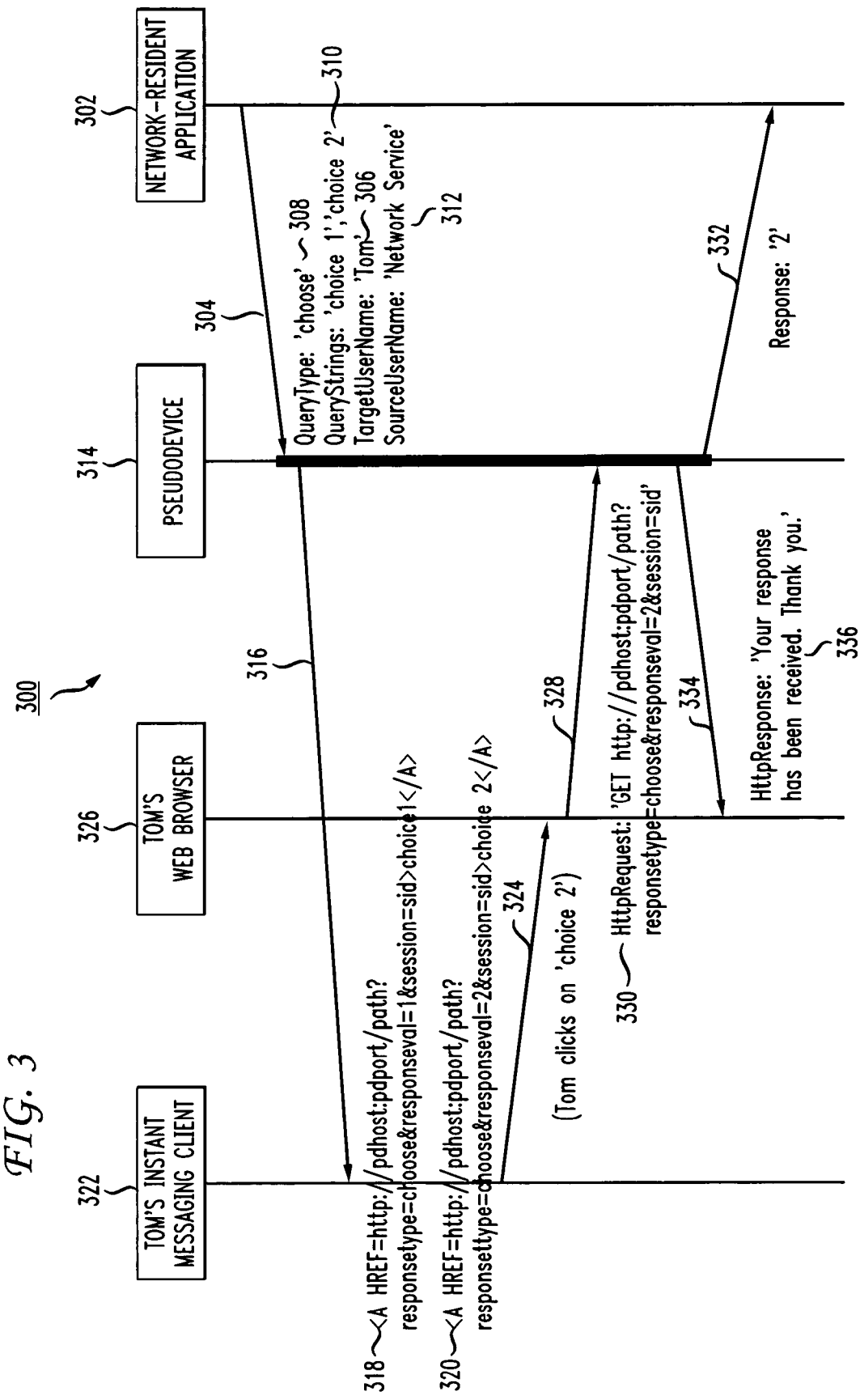
FIG. 3 illustrates a 'choose' query sequence diagram illustrating aspects of the present invention.
Figure 4:
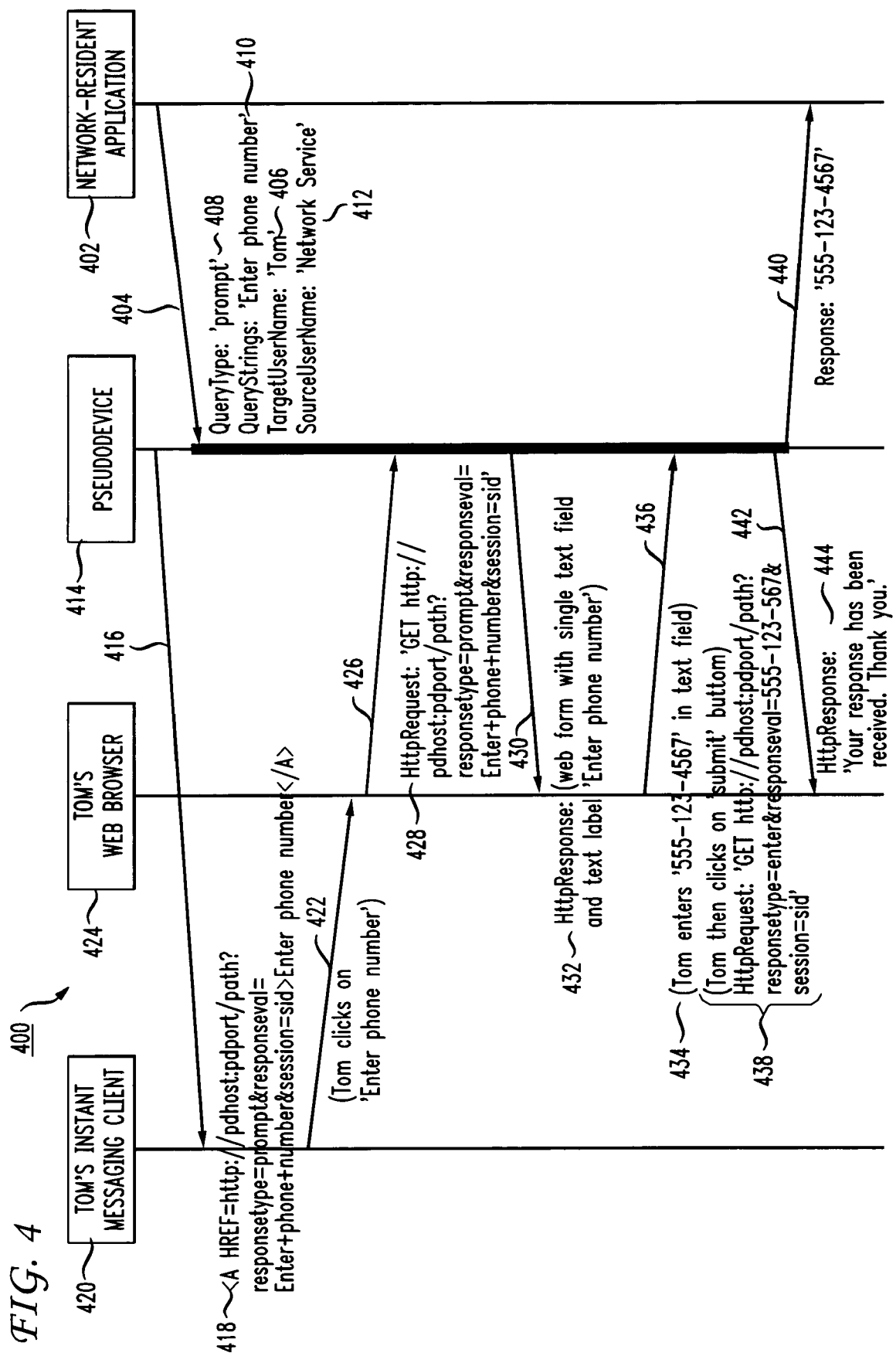
FIG. 4 illustrates a 'prompt' query sequence diagram illustrating aspects of the present invention.

FIGS. 2, 3, and 4 show sequence diagrams 200, 300 and 400, respectively, illustrating the use of the pseudodevice by a network-resident application for the 'display,' 'choose,' and 'prompt' queries, respectively. The sequence diagrams further illustrate the path shown in FIG. 1 including the network resident application 106, the pseudodevice 104, the user's web browser 112 and the user's instant messaging client 110 with directed actions indicating the steps followed for the 'display', 'choose', and 'prompt' queries. It is assumed that displayed 208, as a result of a display query to a user with instant messaging name 'Tom' 210. The network-resident application 202 also specifies that the message should appear to come from a user with instant messaging name 'Network Service' 212. The pseudodevice 214 formats the message and sends the message 216 to Tom's instant messaging client 218. Since no response is associated with a 'display' query, the pseudodevice immediately releases the network-resident application.

FIG. 3 shows a choose query sequence diagram 300 for a scenario where a network-resident application 302 makes a request 304 that a user with the username 'Tom' 306 makes a choice, as a result of a choice query 308, between one of two alternatives choices, choice 1 and choice 2 in query string 310. In addition, the message is to appear with the instant messaging name 'Network Service' 312. The pseudodevice 314 sends the choices 316 in the form of HTML links 318 and 320 to Tom's instant messaging client 322. In the example shown, Tom makes a response 324 by clicking on the link 320 corresponding to the second choice displayed in his instant messaging client. Clicking on the link 320 has the effect of invoking Tom's browser 326 that, in turn, relays the HTTP request 328/330 associated with the link 320 back to the pseudodevice 314. For synchronous operation, the network-resident application 302 is held by the pseudodevice 314 until the user's response, in this case 328/330, is received. Once the HTTP request is received, the network-resident application 302 is given the user's response in the format of output 332 of pseudodevice 314 which is associated with the request and the network-resident application 302 is then released. The pseudodevice 314 provides HttpResponse 334/336 back to Tom's web browser 326 indicating 'Your response has been received. Thank you.'

FIG. 4 shows a prompt query sequence diagram 400 for a scenario where a network-resident application 402 makes a prompt request 404 that a user with the username 'Tom' 406 enter a phone number 410 at which he can currently be reached as a result of a prompt query 408. When displayed, the message is to appear with the instant messaging name 'Network Service' 412. The pseudodevice 414 sends the prompt 416 in the form of an HTML link 418 to Tom's instant messaging client 420. In the example shown, Tom makes a response 422 by clicking on the link 'Enter phone number' displayed in his instant messaging client. Clicking on the link 418 has the effect of invoking Tom's browser 424 which, in turn, relays an HTTP request 426/428 associated with the link 418 back to the pseudodevice 414.

In response to the HTTP request 426/428, the pseudodevice 414 sends response 430/432 which includes a form which initiates Tom's browser 424 to prompt for the additional information. It is into this form which Tom enters entry 434, for example the number '555-123-4567'. Tom then clicks on the submit button to convey his entry back to the pseudodevice 414. Clicking on the submit button invokes Tom's web browser 424 to relay the entry in the form of another HTTP request 436/438. For synchronous operation, the network-resident application 402 is held by the pseudodevice 414 until the user's response, in this case 436/438, is received. Once the HTTP request is received, the network-resident application 402 is given the response in the format of output 440 which is associated with the request and the network-resident application 402 is then released. The pseudodevice 414 provides HttpResponse 442/444 back to Tom's web browser 424 indicating 'Your response has been received. Thank you.'

Pseudodevice Subcomponents

Figure 5:
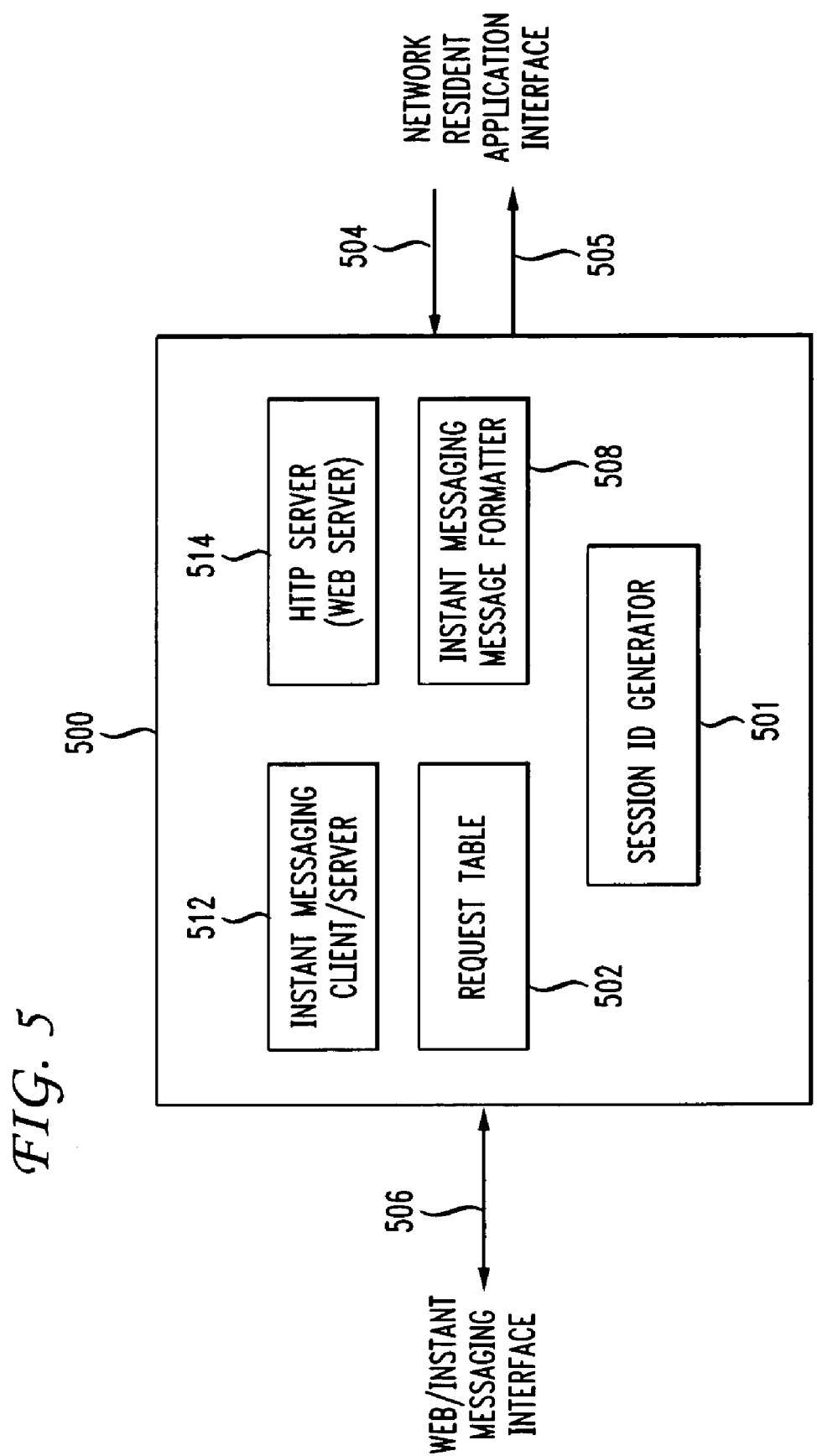
FIG. 5 illustrates the major subcomponents of the present invention.

Major subcomponents of one suitable implementation of a pseudodevice 500 are shown in FIG. 5. These major subcomponents functionally cooperate and communicate with each other as described in more detail in the FIG. 6 pseudocode section below. The pseudodevice 500 generates a unique session ID, in a session ID generator 501, for each request received on its network-resident interface port input 504. A request table 502 maintains a mapping from a unique session ID to the requester and is designed to support a plurality of requests that may be generated from a plurality of network-resident applications. When a response is received from a user on the web/instant messaging interface I/O port 506, the pseudodevice 500 looks up the session ID based on the user's response in the request table 502 in order to provide the response on its network-resident interface port output 505 to the original requester. In a system with a plurality of network-resident applications generating a plurality of requests, the handling of the plurality of requests is not limited by the construction of the pseudodevice. Rather alternative means, such as queues, round-robin servicing, priority servicing and the like, can be used in the pseudodevice to handle the multiple requests, as dictated by the system design.

An instant messaging message formatter 508 formats a request message prior to sending the message to a user's instant messaging client over the web/instant messaging interface I/O port 506. Instant messaging services constrain the format of messages sent to their instant messaging clients. For example, maximum line length is typically constrained. The formatter component 508 takes a request type and its associated request string arguments, and formats the messages to satisfy any such constraints.

The pseudodevice 500 can also act as an instant messaging client or server. In the client case, an instant messaging client/server 512 registers itself online with another instant messaging server. In the server case, the instant messaging client/server 512 accepts registrations from the user's instant messaging clients, or other instant messaging servers. In various network configurations, the pseudodevice can keep track of directly attached and external-server attached instant messaging clients and act accordingly depending upon the service/user path. In any case, the instant messaging client/server 512 is used to send a message to another instant messaging user.

A web server 514 embedded in the pseudodevice 500 responds to HTTP requests from a user's web browser over the web/instant messaging interface I/O port 506. It also is responsible for conveying the user's response back to the original requester. Typically, this component would be a stock web server supporting the common gateway interface (CGI) or a servlet engine.

While a presently preferred embodiment of a pseudodevice includes a local HTTP Server/web server, the pseudodevice can be designed in a variety of alternative configurations. For example, an alternative pseudodevice, providing advantageous operations as described in the present invention, can be implemented with an external HTTP Server/web server that is configured to communicate with the pseudodevice.

Interface Pseudocode

High-level pseudocode 600 is shown in FIG. 6. Pseudocode 600 describes the behavior of a pseudodevice such as the exemplary pseudodevice 500 implemented using the major subcomponents identified in FIG. 5 which cooperate in response to interface events, as discussed below. The network-resident interface pseudocode 602 generates a unique session ID for a request received from a network-resident requester over an interface port, such as port 504, in a session ID generator, such as session ID generator 501. A requester entry is added in a request table, such as request table 502. Next, a request message is formatted using an instant messaging message formatter, such as formatter 508. Then, a message is sent to the user over a web/instant messaging interface, such as interface 506 using an instant messaging client/server, such as instant messaging client/server 512.

The web browser/instant messaging interface pseudocode 610 provides interface functions to a user device's HTTP client, such as user's HTTP client 112. If a user's request URL type is 'choose' or 'enter', then the HTTP server/web server, such as server 514, interface returns a web page to the user with the message "Your response has been received. Thank you." The HTTP server/web server, such as server 514, interface looks up an entry in a request table, such as table 502, that corresponds to the response it has received from the user over a web/instant messaging interface I/O port, such as interface I/O port 506. Then, the response is conveyed to the requester over a network-resident application interface, such as interface port 505. If a user request URL type is 'prompt', then the HTTP server/web server, such as server 514, interface returns a web page to the user device with a form for entering a response to the requester. When the user submits their response it is received via a URL whose type is 'enter'.

While the present invention has been disclosed in a presently preferred context, it will be recognized that the present teachings may be adapted to a variety of contexts consistent with this disclosure and the claims that follow.

We claim:

1. A system for communicating between a network-resident software application and a user device, the system comprising:
   a network; and
   a pseudodevice comprising:
      a first port for communications between the network-resident software application and the pseudodevice;
      a second port for communications between the pseudodevice and the user device;
      a first interface function associated with the first port for receiving a message request from the network-resident software application and for sending a response to the network-resident software application, wherein the message request from the network-resident software application comprises query parameters to specify the type of query to send to the user device and the query parameters comprise a query type, query strings, a target username, and a source username supplied by the pseudodevice, wherein the instant message when received in the user device appears to come from an instant messaging user separate from the pseudodevice; and
      a second interface function associated with the second port for sending in response to the message request an instant message to the user device in a format adapted for communication with an instant messaging client resident on the user device, and receiving an HTTP request from a web browser located on the user device, providing a selected response to the received HTTP request, and sending an HTTP response in a format adapted for communication with an HTTP client on the user device.

2. The pseudodevice of claim 1, wherein the query type further comprises:
   a type display for use in displaying strings to the user device;
   a type choose for offering a menu of choices; and
   a type prompt for requesting information to be entered.

3. The pseudodevice of claim 1 further comprising:
   a session ID generator for assigning a unique session ID for a message request from the network-resident software application;
   a request table for maintaining a unique session ID mapping to the software application that initiated the message request;
   an instant messaging message formatter for formatting a message to conform to an instant messaging interface standard;
   an instant messaging client/server for use in sending messages to another instant messaging user; and
   an HTTP server for receiving HTTP requests, providing a selected response to a received HTTP request, and sending HTTP responses.

4. A method for communicating between a network-resident software application and a user device through a network-resident component, the method comprising:
   receiving in the network-resident component a message request from the network-resident software application, wherein the message request from the network resident software application comprises a query type, query strings to be displayed, a target user name parameter for the instant messaging name of the user device, and a source user name parameter supplied by the network-resident component to specify an arbitrary source;
   translating in the network-resident component the message request to a hyperlinked instant message to the user device in a format adapted for communication with an instant messaging client resident on the user device;
   sending the hyperlinked instant message from the network-resident component to the user device;
   receiving in the network-resident component an HTTP request from a web browser located in the user device as a user response to a user action that was elicited by the hyperlinked instant message;
   sending from the network-resident component to the user device a selected type of HTTP response dependent upon the type of HTTP request received; and
   sending the user response from the network-resident component to the network-resident software application that initiated the message request for selected types of HTTP requests.

5. The method of claim 4 wherein the message request from the network-resident software application is a display message request.

6. The method of claim 4 wherein the message request from the network-resident software application is a choose message request.

7. The method of claim 4, wherein the hyperlinked instant message further comprises:
   an embedded unique session identifier, unique message type, and unique message identifier for selected message requests that elicit a user response in a uniform resource locater (URL) associated with a hyperlinked text message that is sent to the user device, where the URL is used by the user device to identify the network-resident component for sending a response.

8. A method for requesting information from a user by communicating between a network-resident software application and a user device through a network-resident component, the method comprising:
   receiving in the network-resident component a message request for information from a user from the network-resident software application, wherein the message request from the network resident software application further comprises a query type, query strings to be displayed, a target user name parameter for the instant messaging name of the user device, and a source user name parameter supplied by the network-resident component to specify an arbitrary source;
   translating in the network-resident component the message request to a hyperlinked instant message to the user device in a format adapted for communication with an instant messaging client resident on the user device;
   sending the hyperlinked instant message from the network-resident component to the user device;
   receiving in the network-resident component a first HTTP request from a web browser located in the user device as a response to a user action that was elicited by the hyperlinked instant message;

sending from the network-resident component to the user device a selected type of HTTP response including a web form for entry of the requested information, in response to the first HTTP request;

receiving in the network-resident component a second HTTP request from the user device's web browser as a user response to a user action that was elicited by the selected type of HTTP response, the user response including the web form filled out with the requested information; and sending the user response including the requested information from the network-resident component to the network-resident software application that initiated the message request for selected types of HTTP requests.

9. The method of claim 8 wherein the message request from the network-resident software application is a prompt message request.

10. The method of claim 8, wherein the hyperlinked instant message further comprises:

an embedded unique session identifier, unique message type, and unique message identifier for selected message requests that elicit a user response in a uniform resource locater (URL) associated with a hyperlinked text message that is sent to the user device, where the URL is used by the user device to identify the network-resident component for sending a response.

11. A computer-readable medium having code stored thereon that when executed causes a computer system to perform in a unified real-time manner interactions between at least one network-resident software application and at least one user device through a network-resident component, by performing the steps of:

receiving a selected message request in the network-resident component from the network-resident software application, wherein the selected message request from the network resident software application further comprises a query type, query strings to be displayed, a target user name parameter for the instant messaging name of the user device, and a source user name parameter supplied by the network-resident component to specify an arbitrary source;

translating in the network-resident component the selected message request to an instant message in a selected instant message format adapted for communication with an instant messaging client resident on the user device;

sending the instant message from the network-resident component to the user device;

communicating and adapting the communications between the network-resident component and a web browser HTTP client resident on the user device for selected message requests; and sending a user response from the network-resident component to the network-resident software application that initiated the message request for selected message requests.

12. The computer readable medium of claim 11, wherein the network-resident component comprises:

a first software interface function which is used for responding to the selected message request from the network-resident software application and sending a user response to the network-resident software application that initiated the message request for selected message requests; and a second software interface function which is used for translating the selected message request to a selected instant message format adapted for communication with an instant messaging client resident on the user device, sending the instant message from the network-resident component to the user device, and communicating and adapting the communications with an HTTP client resident on the user device for selected message requests.

13. A computer-readable medium having code stored thereon that when executed causes a computer system to perform in a unified real-time manner interactions between at least one network-resident software application and at least one user device, the computer system having a pseudodevice as a unified software interface function that provides an interface between the at least one network-resident software application and the at least one user device, by performing:

receiving a selected message request in the pseudodevice from the network-resident software application, wherein the selected message request from the network resident software application further comprises a query type, query strings to be displayed, a target user name parameter for the instant messaging name of the user device, and a source user name parameter supplied by the pseudodevice to specify an arbitrary source;

translating in the pseudodevice the selected message request to a selected instant message format adapted for communication with an instant messaging client resident on the user device;

communicating and adapting the communications between a web browser's HTTP client resident on the user device and the pseudodevice for selected message requests; and sending a user response from the pseudodevice to the network-resident software application that initiated the message request for selected message requests.

* * * * *